United States Patent
Shurvinton et al.

(10) Patent No.: US 6,822,619 B2
(45) Date of Patent: Nov. 23, 2004

(54) ANTENNA SYSTEM

(75) Inventors: Bill Shurvinton, Hook (GB); Chris Hancock, Winchester (GB)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/312,330

(22) PCT Filed: Jun. 27, 2001

(86) PCT No.: PCT/EP01/07295
§ 371 (c)(1),
(2), (4) Date: Jul. 15, 2003

(87) PCT Pub. No.: WO02/03498
PCT Pub. Date: Jan. 10, 2002

(65) Prior Publication Data
US 2004/0014502 A1 Jan. 22, 2004

(30) Foreign Application Priority Data
Jun. 30, 2000 (GB) .............................. 0016186

(51) Int. Cl.⁷ .............................................. H01Q 21/00
(52) U.S. Cl. ...................... 343/853; 343/757; 343/890
(58) Field of Search ................. 343/853, 757, 343/890, 850; 455/33.3, 134, 562.1, 277.1; 342/373

(56) References Cited

U.S. PATENT DOCUMENTS

| | | | |
|---|---|---|---|
| 5,548,813 A | 8/1996 | Charas et al. | 455/33.3 |
| 5,771,017 A * | 6/1998 | Dean et al. | 342/374 |
| 5,870,681 A | 2/1999 | Myer | 455/582 |
| 5,969,675 A | 10/1999 | Erlick | 342/37.3 |
| 6,236,866 B1 * | 5/2001 | Meyer et al. | 455/562.1 |
| 6,453,177 B1 * | 9/2002 | Wong et al. | 455/562.1 |

FOREIGN PATENT DOCUMENTS

| | | | |
|---|---|---|---|
| GB | 2 307 142 A | 5/1997 | H04Q/7/36 |
| WO | WO 96/29836 | 9/1996 | H04Q/7/36 |
| WO | WO 97/46039 | 12/1997 | H04Q/7/36 |
| WO | WO 98/42150 | 9/1998 | H04Q/7/00 |
| WO | WO 99/60659 | 11/1999 | H01Q/1/24 |

* cited by examiner

*Primary Examiner*—Hoang V. Nguyen
(74) *Attorney, Agent, or Firm*—Squire, Sanders & Dempsey LLP (57) ABSTRACT

An antenna system for a transmitter comprising an array of antennas and control means. The antennas are arranged to transmit over all or part of the transmitters coverage area. The control means control the number of antennas that are used to transmit a signal in dependence on the width of the signal to be transmitted.

14 Claims, 6 Drawing Sheets

ANTENNA SYSTEM

FIELD OF INVENTION

The present invention relates to an antenna system and in particular but not exclusively to an antenna system for use in a base transceiver station of a wireless telecommunications network.

BACKGROUND TO THE INVENTION

An area covered by a cellular telecommunications network is divided into a plurality of cells. Each of these cells has a base station arranged to transmit signals to and receive signals from mobile stations located in the cell associated with the respective base station. Mobile stations will be in active communication with the base station associated with the cell in which the mobile station is located.

In order to improve the capacity and/or the signal to interference ratio, beam steering or beam selection techniques have been proposed. With beam steering or selection techniques, a base station is able to generate one or more beams. In the case of beam selection, the base station will be capable of producing a fixed number of beams to cover the cell associated with the base station. In certain conditions, not all of the beams will be selected for communication with a given mobile station. For example, if it can be determined where the mobile station in question lies in the cell, the beam or beams, which cover that part of the cell in which the mobile station is located only will be selected to transmit a signal. Accordingly, that signal for fine mobile station in question Will not be transmitted in the other non-selected beam directions.

Beam steering uses a similar concept. Rather than having a fixed number of beams, the number of beams generated can be varied and the width of those beams can be varied. As with the beam selection technique, one or more beams can be generated, in appropriate circumstances, to transmit a signal over only part of a cell.

With both of these techniques, as not all signals are transmitted throughout the whole cell, the interference generated is reduced. This can allow an increase in capacity to be achieved. Both of these techniques use an array of antennas in order to generate the beams.

A base station allocated to the cell in which a particular mobile station is located, can sometimes receive a plurality of representations of the same signal transmitted from the particular mobile station, the different representation being received at different times. In other words, a signal received by a base station from a particular mobile station could be a new signal or a representation of a previously recovered signal. The various representations of a signal received at different times, is due to multipath propagation.

In dense urban environments the signal generated by the mobile station can reflect off objects such as buildings in the environment. This means that a particular signal may take a number of different routes from the mobile station to reach the base station. These routes are usually of varying lengths so that representations of the same signal arrive at the base station at different times. These representations of signals which arrive at different times are multipath representations of the original signal.

To locate the position of a particular mobile station in a cell, the base station can use the strongest received signal from the mobile station. The base station can then direct the beam of the phased antenna array in the direction of the strongest received signal as it is usually assumed that the direction of the strongest signal strength reception will also be the best transmit direction.

The base transceiver station may determine the direction where the target mobile station may be located by utilising the received signal at the antenna array. A signal transmitted by a mobile station will generally be received by all the antenna elements within the antenna array. There will however, be a difference in the phase of each of the otherwise substantially similar signals received by each of the individual antenna elements. From the relative phase shifts, the base transceiver station determines the direction from which the received signal has been received.

The assumption that the strongest received signal direction is the best transmit direction may not be correct for frequency division duplex systems (such as for Global System for Mobile communications (GSM) systems). In frequency duplex systems, a base station sends signals to a mobile station in a first frequency range and receives signals from the mobile station in a second different frequency range. Different channel conditions may exist for the receive and transmit directions due to the different frequencies. The best transmit direction, especially For mobile stations close to the base station, may be very different to the strongest received signal direction. If the beam is directed to a different location, away from the actual location of the mobile station, the mobile station may not receive the signal from the base station or only weakly receive the signal. To compensate, the base station may then use full power to improve the connection. This increases the interference level in the network, so reducing overall traffic capacity and increasing power consumption within the base station.

Base stations, which have a particular mobile station in close proximity, are susceptible to multipath representations of signals from the mobile station. This makes the mobile stations in close proximity to the base station very difficult to locate because the direction from which the strongest signal is received may be very different to the direction from which the signal was originally transmitted. This means therefore that the overall traffic capacity may be reduced as a large amount of base station resources may be allocated to the particular mobile station.

Additionally, as a beam directed by a phased antenna array is steered towards a target a large angle away from boresight of the antenna array, the beam width increases. This is disadvantageous because the increased beam width away from the boresight can cause unnecessary interference. Conversely, if the beamwidth is too narrow, because of inaccuracies in locating mobile stations, a target mobile station may be missed. Inaccuracies in locating a target mobile station may be caused by, for example, multipath reflections or variations in propagation conditions.

SUMMARY OF INVENTION

It is therefore the aim of the present invention to provide an antenna system which addresses one or more of the problems as discussed above.

According to a first aspect of the present invention there is provided an antenna system for a transmitter, said antenna system comprising an array of antennas arranged to transmit a signal over part of or all of a coverage area of said transmitter; and control means for controlling the number of antennas which are used to transmit a signal in dependence on the width of the signal to be transmitted.

According to a second aspect of the present invention there is provided a method of transmitting with an array of antennas, said method comprising steps of selecting the number of antenna elements to be used to transmit a signal in dependence on the width of the signal to be transmitted and transmitting a signal over part or all of a coverage area.

BRIEF DESCRIPTION OF DRAWINGS

For a better understanding of the present invention and as to how the same may be carried into effect, reference will now be made by way of example to the accompanying drawings in which:-

DETAILED DESCRIPTION OF EMBODIMENTS OF THE PRESENT INVENTION

Figure 1:
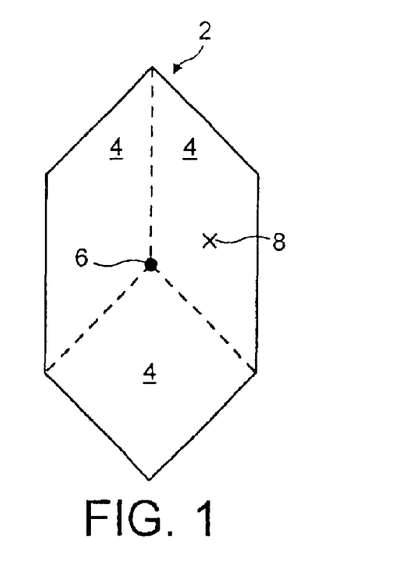
FIG. 1 shows a cell of a telecommunications network in which embodiments of the present invention can be used.

Reference is now made to FIG. 1 which shows part of a cellular telecommunications network 2 in which embodiments of the present invention can be implemented. The area covered by the network is divided into a plurality of cells, three of which are shown in FIG. 1. Each cell 4 has associated therewith a base transceiver station 6. In the example shown in FIG. 1, the base transceiver station associated with each cell 4 is provided at a common location. The base transceiver stations 6 are arranged to communicate with mobile terminals 8 located in the cell 4 associated with a given base station.

The embodiment of the present invention will be described in the context of a GSM system. It should be appreciated however that embodiments of the present invention can be used with any other system such as other frequency division multiple access systems, time division multiple access systems and spread spectrum systems such as code division multiple access. Embodiments of the present invention can also be used with hybrids of one or more of the above systems.

Figure 2:
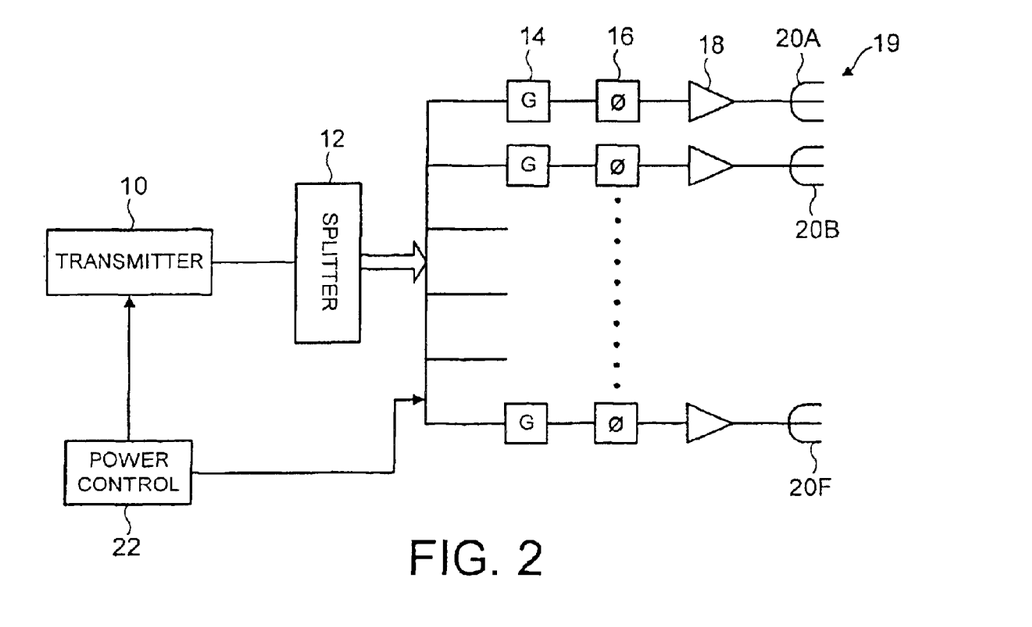
FIG. 2 shows a block diagram of an architecture for a smart antenna system.

Reference is now made to FIG. 2 which shows an architecture for a smart antenna system. In particular, FIG. 2 shows part of a base transceiver station which provides a steered beam system. This steered beam system is sometimes referred to as a smart antenna system. It should be appreciated that embodiments of the present invention can also be used with beam selection arrays, as described previously, in which a fixed number of beams are provided, one or more of which are selectable or any other type of arrangement which provides a number of beams.

The antenna array 19 illustrated in FIG. 2 comprises six antennas 20a–f. Each antenna is made up of one or more antenna elements. For example, each antenna 20 may comprise a column or stack of antenna elements. In the embodiment shown in FIG. 2, six antennas are shown. Alternative embodiments of the present invention however may have different number of antennas.

Each antenna 20a–f has at its input a corresponding power amplifier 18a–f. Each power amplifier 18a–f amplifies the signal received at its input. The input of each power amplifier 18a–f is connected to the output of a respective phase adjustment block 16a–f. The input of each phase adjustment block is connected to the output of a respective gain adjustment block 14a–f. The input to each phase adjustment block 16a–f is provided by the output of a respective gain adjustment block 14a–f. The phase and gain adjustment blocks 16a–f and 14a–f alter the phase and gain of the signal at their respective inputs so that the antenna array 19 is able to provide steered beams. The way in which the beams are generated is by providing the same signal to one or more of the antenna elements. The phase difference between the versions of the same signal applied to the different antennas 20a–f cause constructive and/or destructive interference to occur so that a beam in a required direction can be generated. The phase of a given signal to be applied to the required antenna 20a–f is adjusted by the respective phase adjustment block 16a–f. The gain determined by the gain adjustment block 14a–f accordingly determines the power with which a signal is transmitted by the respective antenna element 20a–f. Different antenna may transmit with different power levels depending on the beam shape required.

The input of each of the gain adjustment block 14a–f is connected to the output of a power splitter unit 12. The power splitter unit 12 distributes identical signals, each with the same signal strength, to the respective input of the gain adjustment blocks 14a–f. The input of the power splitter unit 12 is connected to the output of a transmitter arrangement 10. The transmitter arrangement 10 provides at its output, signals which are to be transmitted. These signals are radio frequency signals. The transmitter arrangement 10 thus converts signals from a base band frequency to a radio frequency.

There is connected to the transmitter 10 and the plurality of gain adjustment blocks 14a–f a power control arrangement 22. The Dower control arrangement 22 enables the base transceiver station 6 to control the allocation of base transceiver station 6 power at any one time.

Figure 3A:
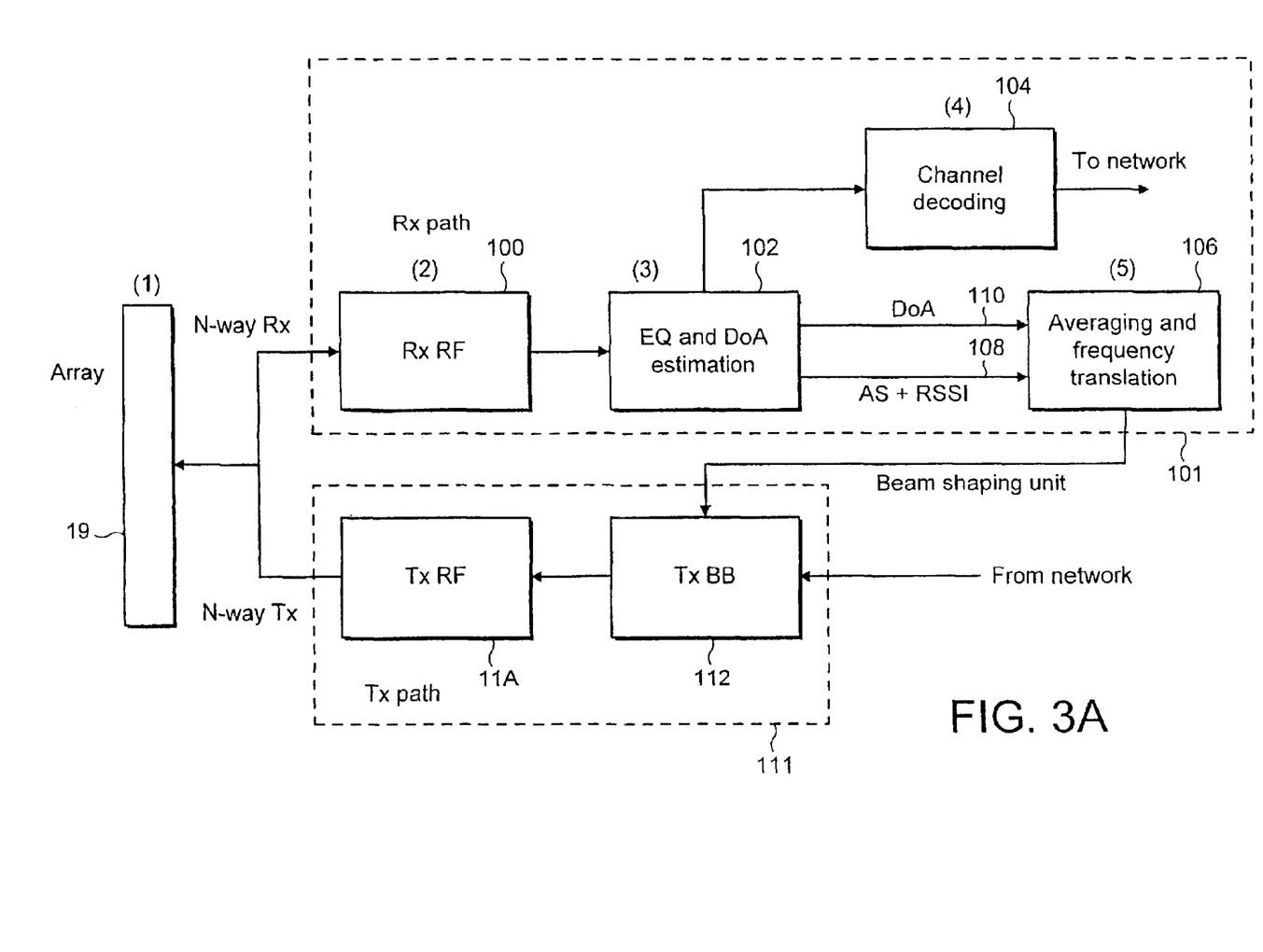
FIG. 3a shows a block diagram of an architecture of a system for locating the direction of a mobile station.

Reference will now be made to FIG. 3a which shows a block diagram of a beam steering base transceiver station incorporating the present invention. The antenna array 19 is firstly connected to a receiver unit 101. The receiver unit 101 comprises firstly a radio frequency receiver 100. The radio frequency receiver 100 at its input receives a plurality signals from the antenna array 19. These signals are at a radio frequency and are signals received by the different antennas of the array 19. The radio frequency receiver 100 downconverts the received plurality of signals into a plurality of signals at a lower frequency. The downconverted signals may be at an intermediate or baseband frequency.

The downconverted signals are then fed into an equalisation and direction of arrival unit 102. The function of the equalisation and direction of arrival unit 102 will be described in detail hereinafter.

A channel decoding unit 104 is attached to a first output of the equalisation and direction of arrival unit 102. The channel decoding unit 102 is known in the art and will therefore not be described in any detail hereinafter.

The equalisation and direction of arrival unit 102 is described with reference to FIG. 3b.

Figure 3B:
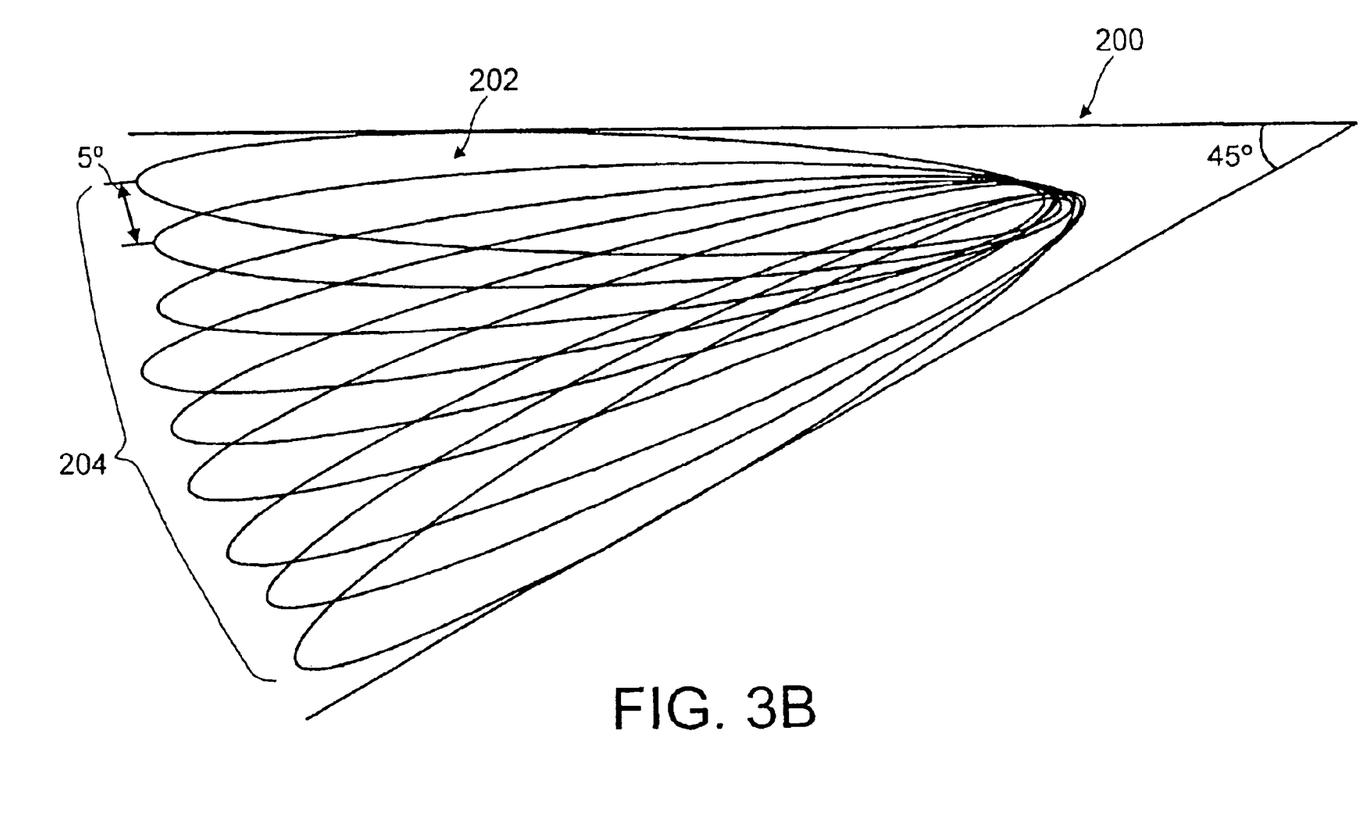
FIG. 3b shows a schematic view of segments synthesised for locating the direction of a mobile station.

FIG. 3b shows a grid of segments synthesised by the equalisatlion and direction of arrival unit 102. A sector 200 spanning an angle is divided by the equalisation and direction of arrival unit 102 during initial processing, into a plurality of segments 202. Each segment 202 may or may not span a substantially similar angle. In other words, the sector 200 may or may not have the angle which it spans divided equally among a plurality of segments 202. Usually the sector 200 spans 120° and which is divided into twenty four segments, each segment 202 being substantially equally separated by 5°. For clarity, FIG. 3b shows a sector 200 spanning 45°, divided into nine segments 204.

The plurality of signals received by the antenna array 19 are downconverted by the radio frequency receiver 100 and are passed to the equalisation and direction of arrival unit 102, as previously described. The equalisation and direction of arrival unit 102 passes the plurality of received signals through the synthesised segments 202. The direction of arrival unit 102 measures the strength of the received signal in each beam by performing a convolution on the training sequence of the received signal. A table showing the received power in each segment 202 is compiled. The compiled table may be used to determine the direction from which the plurality of signals were received and angular spread of the received signals.

In the case of similar received signal power levels being present in a plurality of adjacent segments 202, the equalisation and direction of arrival unit 102 may infer that the plurality of received signals has an azimuth spread (AS) equal to the angle subtended by those segments 202.

In the case of similar received signal power levels being present in a plurality of disparate segments 202, the ecualisation and direction of arrival unit 102 may infer that the plurality of received signals have high multipath levels (that is received from various different directions) and may act accordingly, as described hereinafter.

Additionally, attached to a second output of the equalisation and direction of arrival unit 102 is an averaging and frequency translation unit 106. There is a plurality of connections between the equalisation and direction of arrival unit 102 and the averaging and frequency translation unit 106, each of these connections are arranged to carry data. In this case a first connection 110 is arranged to carry information relating to the direction of arrival of the received signal. A second connection 108 is arranged to carry information relating to the azimuth spread (AS) and the received signal strength indication (RSSI).

The averaging and frequency translation unit 106 is arranged so that the direction of arrival, the AS and the RSSI of a number of bursts of a particular active timeslot are received and an average of the direction of arrival, the AS and the RSSI is calculated. These average values can be used to determine the downlink beamsteering direction and beamwidth.

It should be noted that other information regarding the received plurality of signals could be extracted and used for further processing. For example the RSSI in all the segments 202 could be extracted and used for further processing.

In the embodiments of this invention, it will calculate whether the mobile is close enough or in a multipath environments such that widening the beam will improve call quality without causing increased interference to other users The equalisation and direction of arrival unit 102 and the averaging and frequency translation unit 106 may be present in the base station in which the present invention resides or the base station controller to which the base station is attached.

It should be appreciated that any other suitable strategy can be used in order to determine the direction in which the next beam or beams are to be transmitted. The above method is only one example of a possible method.

The output of the averaging and frequency translation unit 106 is input to a transmitter unit 111. The transmitter unit 111 comprises a baseband transmitter 112 and a radio frequency transmitter 114. The output of the averaging and frequency translation unit 106 is fed to the baseband transmitter 112. The output of the baseband transmitter 112 is fed into the radio frequency transmitter 114. The radio frequency transmitter 114 upconverts the input baseband signal to a radio frequency. The transmitter unit 111 is described hereinafter.

Figure 4:
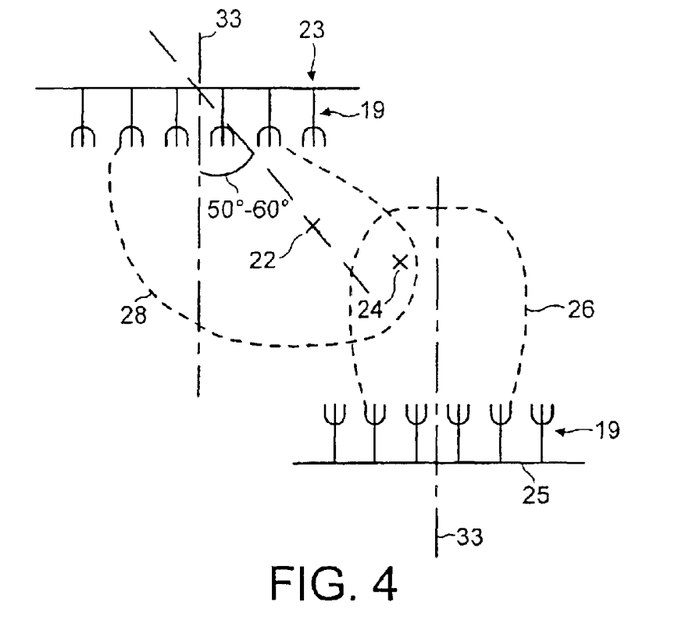
FIG. 4 shows a schematic diagram of a the beams of two antenna arrays in a first scenario.

Reference is now made to FIG. 4 which pictorially shows the widening of the beam as the position of the target mobile station increasingly moves its angular position away from boresight 33. The boresight 33 is a line extending from the centre of the antenna array at right angles to the longitudinal axis of the antenna array 19. A first target mobile station 24 positioned relatively close to boresight 33 or a first base transceiver station 25 with the corresponding first steered beam 26 directed towards the first target mobile station 24. A second target mobile station 22 is positioned at an increased angle (say 50-60) away from boresight 33 of a second base transceiver station 23 which is positioned in a neighbouring cell with the corresponding second steered beam 28 directed towards the second target mobile station 22.

The first steered beam 26 toward the first target mobile station 24 surrounds the first mobile station 24. This steered beam 26 does not surround the second target mobile station 22. The second steered beam 28 toward the second target mobile station 22 however, surrounds the said second target mobile station 22 and, because of the previously described increased beam width, also surrounds the first target mobile station 24. With the second steered beam 28 directed towards the second target mobile station 22 and this beam additionally surrounding the first target mobile station 24, this increases unwanted interference at the first target mobile station 24 and therefore increases interference in the neighbouring cell. Increased interference in the neighbouring cell reduces the channel capacity and the embodiment of the present invention described hereinafter seeks to mitigate the unwanted interference due to increased beam width.

Figure 5:
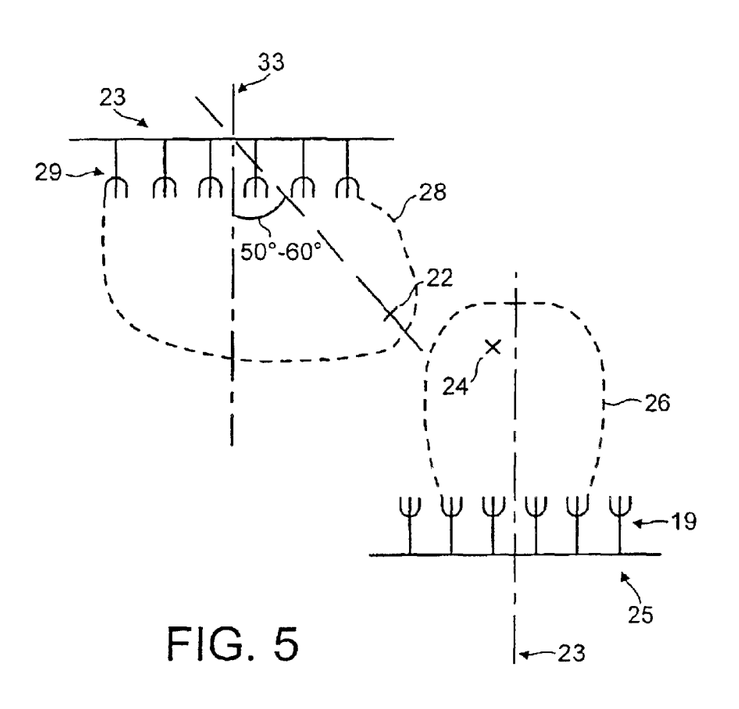
FIG. 5 shows a schematic view of the beams of two antenna arrays of embodiments of the present invention.

Reference is now made to FIG. 5 which shows an embodiment of the present invention in which the beam width at increased angles away from boresight 33 is substantially constant. In other words, the beam width is substantially constant whether the beam is directed towards mobile stations which are positioned at the boresight 33 or at a large angle away from boresight 33. The first target mobile station 24 is positioned close to the boresight 33 of a first base transceiver station 25 and so a corresponding first steered beam 30 is directed toward the first target mobile station 24 with a width w. This steered beam 30 surrounds the first target mobile station 24.

The second target mobile station 22 is positioned at a large angle away from boresight 33 of base transceiver station 23 and a corresponding second steered beam 32 is directed toward the second target mobile station 22. This steered beam 32 surrounds the second target mobile station 22. This is achieved in embodiments of the present invention in that the number of antenna elements 20a–f used when directing the steered beam toward the second target mobile station 22 is increased thus making the beam width substantially constant over a large range of angles around boresight.

The width of the beam of the second base station 23 is therefore the same as the width of the beam of the first base station 25. This means that, in this case, the beam directed toward the second target mobile station 22 does not surround the first target mobile station 24 and so therefore does not increase interference at the first target mobile station 24 and therefore in the neighbouring cell as was the case in FIG. 4. This means that the channel capacity is not reduced.

Figure 6:
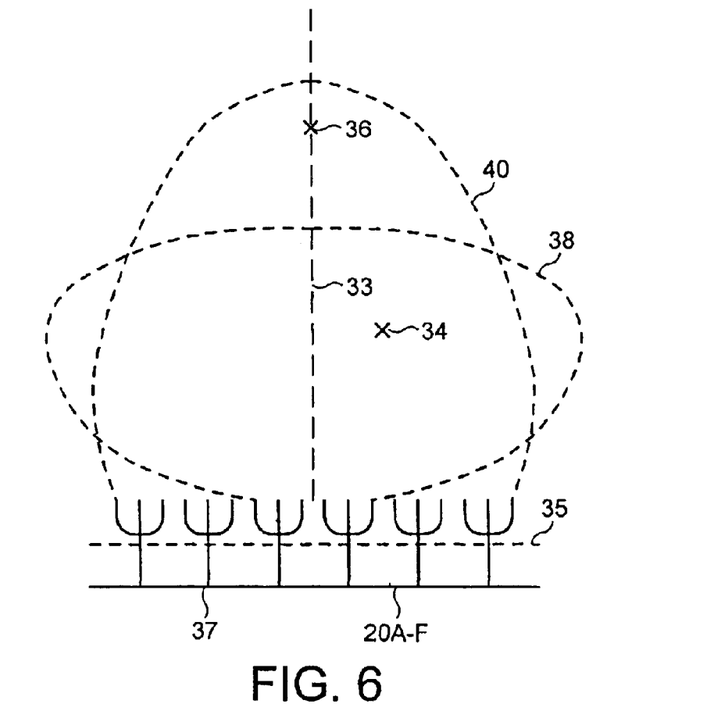
FIG. 6 shows a schematic view of the beams of an antenna array of an embodiment of the present invention.

Reference will now made to FIG. 6 which shows the situation when a second target mobile station 34 is within a close proximity to the antenna array 20a–f. A first target mobile station 36 is positioned a relatively far distance away from the antenna array 20a–f. This relatively far distance is such that it can be thought of as not being within close proximity to the antenna array 20a–f.

When the steered beam 40 is directed towards the first target mobile station 36 the beam width and gain of beam is determined by the base transceiver station based on the signal received From the mobile station. The base transceiver station uses downlink information from a mobile station to produce the appropriate steered beam power. In other words, if the mobile station has a very strong downlink with the base transceiver station the base transceiver station will reduce the transmitting power to the mobile station to conserve base station resources whilst still maintaining a specified downlink signal level. As described previously, the direction of beam pointing may correspond to the direction from where the strongest signal is received.

Multipath propagation hinders the base transceiver station in locating the position of the second target mobile station 34 as described previously. Accordingly this means that there is a poor downlink between the base transceiver station and the second target mobile station 34. Previously the base transceiver station would allocate a large amount of resources to try and improve the downlink between the second base transceiver station 23 and the second target mobile station 34. This was achieved by increasing the transmitter power so that the beam would cover a large part of the network cell. This meant that there was excessive power used by the second base transceiver station 23 and because of the associated increased interference between neighbouring cells, channel traffic capacity would also be reduced.

FIG. 6 however shows the beam shape arrangement as proposed by the preferred embodiment of the present invention. When the steered beam is directed towards the second target mobile station 34, locating the position of the second target mobile station 34 will be hindered by multipath propagation as described above. In embodiments of the present invention, the base transceiver station will appropriately alter the number of active antenna elements 20a–f to mitigate the problems previously described which are associated with multipath propagation. In other words, the base transceiver station will appropriately permute the active antenna elements 20a–f. In a preferred embodiment, this is achieved by inserting, in series with the appropriate antenna element 20a–f, a switching arrangement as discussed hereinafter. By appropriately altering the number of active elements 20a–f, the base transceiver station 37 will cover a greater angle range within a close proximity of the base transceiver station 37. Although the beam will not cover such a large distance away from the base transceiver station, the breadth of coverage will greatly increase. As less antenna elements are active at this time, the amount of power consumed within the base station will additionally be reduced.

As mentioned previously, the angle of beam pointing and the number of antenna elements used vary the beam width. For example for 4 antenna elements pointing at boresight the beamwidth is approximately 25° whereas when 4 antenna elements point at 50° from boresight the beamwidth is approximately 40°. Furthermore, if 6 antennas were pointing at 50° then the beamwidth would be approximately 26°. Six antenna elements pointing at boresight have a beamwidth of 17°. These examples are measured at the 3 dB point of the beam. The number of antennas used will vary on the configuration of the antenna array and will take into account the number of antennas provided as well as the environment.

Figure 7:
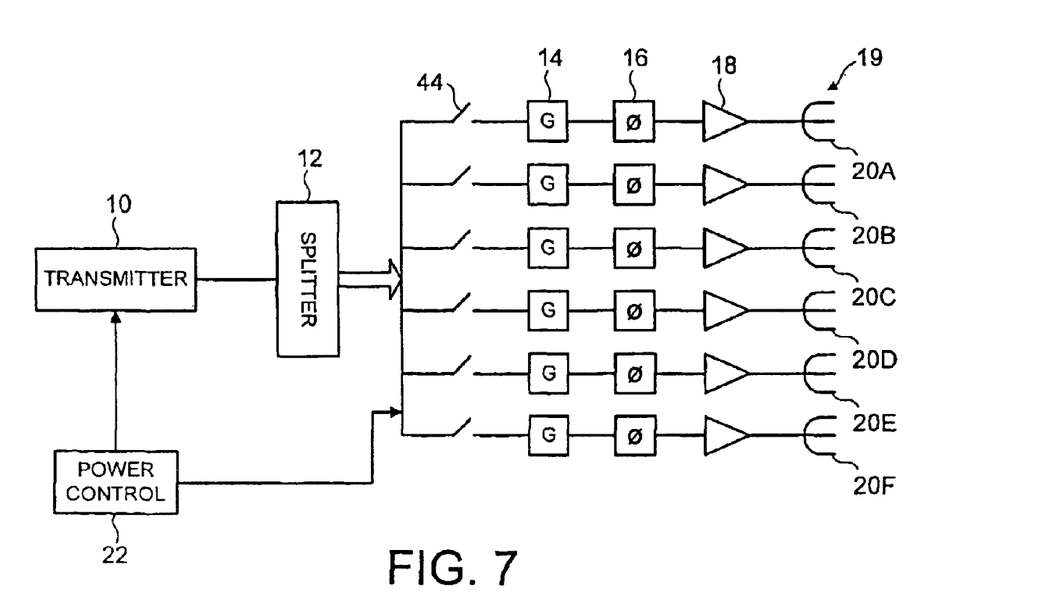
FIG. 7 shows a block diagram of an embodiment of the present invention.

FIG. 7 shows a detailed block diagram of an embodiment of the present invention. This arrangement is the same as shown in FIG. 2 with the addition of a switching unit 44a–f connected to the input of each gain adjustment block 14. The switching units 44a–f controls which antenna element 20a–f is active at any one time. The switching unit 44a–f is connected to the output of the power splitter 12. By permuting the active switches, in other words the switches which are on, the signal will be distributed to the appropriate antenna elements 20a–f. In this way the beam shape can be accordingly altered to mitigate the problems as described hereinbefore.

Figure 8:
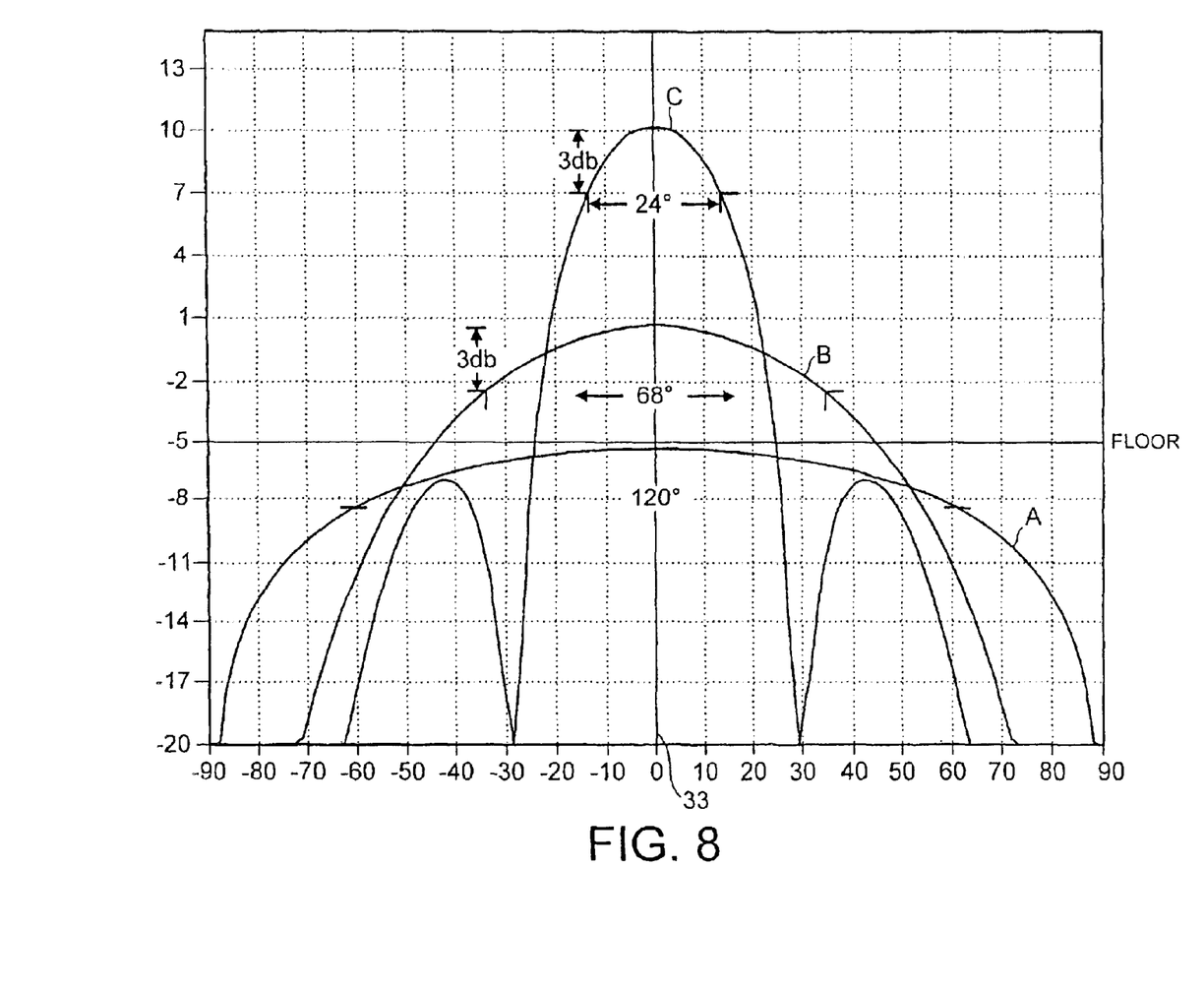
FIG. 8 illustrates the increase in beamwidth as the boresight power is reduced, in embodiments of the present invention.

FIG. 8 shows the beams produced by a phased array antenna 19. When a mobile station is within close proximity to the base station, multipath representations of a received signal hinder the base station from accurately locating the position of the mobile station as discussed previously. FIG. 8 shows how the effect of reducing the boresight gain (that is the power of the beam transmitted along the boresight line 33) affects the beam formed by the antenna array 19. It is seen from FIG. 8 that as the boresight gain is reduced, the beamwidth measured at the 3 dB point of the beam is increased. Line A shows the beam with the smallest gain, line B the beam with the next smallest gain and line C the beam with the highest gain. As the gain of the beam is reduced further the beam tends towards a 120° spread thus covering a greater angle within a close proximity to the base station. As the beam is widened, the pointing requirements of the base station are reduced. This is because the angle covered by the beam is increased so therefore the need for steering the beam is reduced. As the steering requirements of the base station are reduced, the processing load on the base station is reduced. This is advantageous because this will enable the base station to process the signals received from an increased number of mobile stations. Furthermore, as mobile stations situated within close proximity to the base station need a far lower transmitter power, there is little advantage in steering the beam. This means that as there is low transmitter power there will be a reduction in the network interference levels. In summary, beam steering is used for those mobile stations relatively far from the base station but is not used for mobile stations relatively close to the base station.

Embodiments of the present invention described hereinbefore provide a method and associated apparatus to mitigate the problem of interference between and within cells in a mobile telecommunications network. Mitigating the unwanted interference increases channel capacity. Additionally, by reducing the interference within a cell the carrier to interference ratio increases. Carrier to interference ratio is a measure of the quality of signal received. If a received signal has a high carrier to interference ratio the quality of the received signal is deemed to be higher than if it had a low carrier to interference ratio. Increased carrier to interference ratio means that, for a given carrier strength., the quality of the received signal will be better and so the quality of service is consequently improved. As the quality of service is improved, the quality of downlink between the mobile station and the base station is improved. This means that to maintain a given quality of service, the carrier strength can therefore be reduced thus conserving base station resources.

As the carrier to interference ratio increases for a location a given distance from a base station, a given carrier to interference ratio is achieved at a location which is an increased distance from the base station. This means that there is an increased flexibility in the design of the size and shape or a network cell.

Additionally embodiments of the present invention reduce the problem of locating a mobile station which is close proximity to the base station by reducing transmitter power. This reduction of transmitter power has the effect of widening the beam. For a mobile station which is in close proximity to the base station, the steered beam has a greater breadth of coverage although the beam gain is reduced. This is because the mobile station is close to the transmitter so does not require a large beam gain. The transmitter therefore reduces the transmit power and consequently increases beamwidth as described previously. This is advantageous for several reasons. Firstly the need for beam steering is reduced so therefore reducing processing load on the base station. Secondly as the beam gain is reduced the interference caused to mobile stations located in neighbouring cells is also reduced.

What is claimed is:

1. An antenna system for a transmitter, said antenna system comprising:
   an array of antennas arranged to transmit a signal over part of or all of a coverage area of said transmitter, said array having a boresight; and
   control means for controlling the number of antennas which are used to transmit a signal, said control means being arranged to be able to provide a first beam directed to a target close to said boresight using a first number of antennas and a second beam at an angle to said boresight using a second number of antennas, said first and second beams having substantially the same beam width and said first number of antennas being less than said second number of antennas.

2. A system as claimed in claim 1, wherein the control means is arranged to control the number of antennas used to transmit a signal in dependence on the width of the signal to be transmitted.

3. A system as claimed in claim 2, wherein said control means are arranged so that the wider the area over which the signal is to be transmitted the fewer the number of antennas to be used.

4. A system as claimed in claim 1, wherein power control means are provided to control the power with which each antenna transmits.

5. A system as claimed in claim 4, wherein said power control means are arranged to cause the antennas to transmit with a relatively low power when said antennas provide a relatively wide signal.

6. A system as claimed in claim 4, wherein said power control means are arranged to cause said antennas to transmit with a relatively high power when said antennas provide a relatively narrow signal.

7. A system as claimed in claim 1, wherein said antenna array is a smart antenna array.

8. A system as claimed in claim 1, wherein said antenna array is arranged to provide a relatively wide beam when a target to which said signals are to be transmitted is relatively close.

9. A system as claimed in claim 1, wherein said antenna array is arranged to provide a relatively narrow beam when the target is relatively far from said antenna array.

10. A system as claimed in claim 1, wherein said control means comprises a switch associated with each antenna, said switch control if the associated antenna is used.

11. A base transceiver station comprising an antenna system as claimed in claim 1.

12. A method of transmitting with an array of antennas, said method comprising the steps of:
    selecting the number of antenna elements to be used to transmit a signal, wherein if a first beam is to be directed to a target close to a bore sight of the array, a first number of antennas is used and if a second beam is to be directed at an angle to said bore sight, a second number of antennas is used, the first and second beams having substantially the same beam width and the first number of antennas less than the second number of antennas; and
    transmitting a signal over part or all of a coverage area.

13. An antenna system for a transmitter, said antenna system comprising:
    an array of antennas arranged to transmit over part or all of the coverage area of said transmitter;
    control means for controlling the number of antennas which are used to transmit a signal in dependence on the width of the signal to be transmitted, wherein said control means are arranged to alter the number of antennas used so that a substantially constant beam width is obtained.

14. An antenna system for a transmitter, said antenna system comprising:
    an array of antennas arranged to transmit a signal over part of or all of the coverage area of said transmitter, said array having a bore sight;
    and control means for controlling the number of antennas which are used to transmit a signal in dependence on an angle to said bore sight of a beam for transmitting said signal.

* * * * *